United States Patent
Lundstedt, Jr. et al.

(10) Patent No.: US 11,979,176 B2
(45) Date of Patent: May 7, 2024

(54) CONFIGURABLE MODEM ARCHITECTURE FOR SATELLITE COMMUNICATIONS

(71) Applicant: Hughes Network Systems, LLC, Germantown, MD (US)

(72) Inventors: Jack Edwin Lundstedt, Jr., Monrovia, MD (US); Kumud Patel, Clarksburg, MD (US); Walter Kepley, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/704,864

(22) Filed: Mar. 25, 2022

(65) Prior Publication Data
US 2023/0070366 A1    Mar. 9, 2023

Related U.S. Application Data

(60) Provisional application No. 63/242,478, filed on Sep. 9, 2021.

(51) Int. Cl.
*H04B 1/00* (2006.01)
*H04J 3/04* (2006.01)

(52) U.S. Cl.
CPC .......... *H04B 1/0014* (2013.01); *H04B 1/001* (2013.01); *H04J 3/047* (2013.01)

(58) Field of Classification Search
CPC ............ H04B 7/18515; H04B 1/0003; H04B 7/18582; H04B 7/18526; H04B 1/40; H04B 7/18513; H04B 7/0413; H04B 7/0617; H04B 1/707; H04B 1/3827; H04B 2201/7071; H04B 7/022; H04B 7/0885; H04B 7/185; H04B 7/18517; H04B 7/18523; H04B 7/22; H04B 1/0039; H04B 1/0007; H04B 1/0014; H04B 1/0042;
(Continued)

(56) References Cited

U.S. PATENT DOCUMENTS 7,512,103 B1 *  3/2009  Snodgrass ............ H04B 1/0483
                                                          370/337
7,822,967 B2    10/2010 Fung
(Continued)

OTHER PUBLICATIONS analog.com [online], "RF Agile Transceiver Data Sheet AD9361, Rev. F," Jan. 1, 2016, retrieved on Dec. 8, 2022, retrieved from URL<https://www.analog.com/media/en/technical-documentation/data-sheets/ad9361.pdf>, 36 pages.
(Continued)

*Primary Examiner* — Golam Sorowar
(74) *Attorney, Agent, or Firm* — Fish & Richardson P.C.

(57) ABSTRACT

In some implementations, a communication device, includes a printed circuit board comprising conductors routed to support a plurality of different configurations of modulation and/or demodulation functionality. The printed circuit board can have multiple analog output interfaces and one or more analog input interfaces, multiple digital network interfaces, and sockets for components including a controller, multiple processors, digital-to-analog converters (DACs), and an analog-to-digital converter (ADC). Various processor sockets are interconnected to support the processors in different sockets selectively being used for different functions, e.g., as a modulator, burst processor, channelizer, etc.

19 Claims, 9 Drawing Sheets

(58) Field of Classification Search
CPC ........ H04B 1/0046; H04B 1/44; H04B 17/40; H04B 7/0639; H04N 21/47202; H04N 21/64322; H04N 21/2385; H04N 21/426; H04N 21/4263; H04N 21/6143; H04N 21/4147; H04N 21/6193; H04N 21/6405; H04N 21/42684; H04N 21/4382; H04N 21/615; H04N 7/10; H04N 21/234309; H04N 21/23439; H04N 21/23895; H04N 21/2393; H04H 40/90; H04H 20/63; H04H 20/69; H04H 20/08; H04H 20/18; H04H 20/77; H04H 60/21; H04H 60/23; H04H 20/74; H04H 20/38; H04H 20/78; H04H 60/97; H04W 88/16; H04W 88/08; H04W 84/18; H04W 72/0453; H04W 84/12; H04W 4/023; H04W 76/20; H04W 84/042; H04W 84/10; H04W 88/06; H04W 92/02; H04W 16/26; H04W 16/28; H04W 36/06; H04W 36/18; H04W 52/02; H04W 52/0216; H04W 52/40; H04W 56/00
See application file for complete search history.

(56) References Cited

U.S. PATENT DOCUMENTS

| | | | |
|---|---|---|---|
| 8,064,533 | B2 | 11/2011 | Rofougaran |
| 8,301,196 | B2 | 10/2012 | Kauffman et al. |
| 8,326,359 | B2 | 12/2012 | Kauffman |
| 8,407,707 | B2 | 3/2013 | Sonnier et al. |
| 8,489,791 | B2 | 7/2013 | Byrne et al. |
| 8,489,794 | B2 | 7/2013 | Byrne et al. |
| 8,769,808 | B2 | 7/2014 | Davis et al. |
| 8,874,843 | B2 | 10/2014 | Okin et al. |
| 8,904,028 | B2 | 12/2014 | Iannaccone et al. |
| 9,251,061 | B2 | 2/2016 | Karamcheti et al. |
| 10,684,949 | B2 | 6/2020 | Sutardja |
| 2008/0173474 | A1 | 7/2008 | Ta |
| 2015/0086196 | A1* | 3/2015 | Tazawa ................... H04L 43/10 398/33 |
| 2020/0220613 | A1* | 7/2020 | Rutt ..................... H04B 1/0042 |
| 2021/0019631 | A1 | 1/2021 | Das et al. |

OTHER PUBLICATIONS

Budroweit, "Software-defined radio with flexible RF front end for satellite maritime radio applications," CEAS Space Journal, May 19, 2016, 8(3):201-213.

International Search Report and Written Opinion in International Appln. No. PCT/US2022/042758, dated Dec. 19, 2022, 17 pages.

Zeif et al., "From OPS-SAT to PRETTY Mission: A second generation software defined radio transceiver for passive reflectometry," Proceedings of the 2020 International Conference on Broadband Communications for Next Generation Networks and Multimedia Applications (COBCOM), Jul. 7, 2020, 8 pages.

* cited by examiner

CONFIGURABLE MODEM ARCHITECTURE FOR SATELLITE COMMUNICATIONS

CROSS-REFERENCE TO RELATED APPLICATIONS

This application claims the benefit of priority to U.S. Provisional Patent Application No. 63/242,478, filed on Sep. 9, 2021, the entire contents of which are incorporated by reference herein.

FIELD

This specification generally describes technology related to providing improved modems for satellite gateways.

BACKGROUND

In a satellite communication system, a gateway is used as a ground station to connect a terrestrial network, such as Internet, and satellites orbiting Earth. For example, the gateway can transmit data from user terminals or any other nodes in the Internet to the orbiting satellites. Further, the gateway can receive data from the orbiting satellites and relay the data to the Internet. The gateway uses antennas and other equipment for converting, transmitting, and receiving signals. For example, the gateway includes a modem that includes a modulator and/or a demodulator. The modulator transmits data by modulating one or more carrier wave signals to encode digital information. The demodulator receives data by demodulating the signal to recreate the original digital information.

SUMMARY

In some implementations, a circuit board provides a highly versatile platform that supports many different configurations of modulation and demodulation capability for satellite communication systems. As discussed below, a single circuit board can provide the basis to serve as a modulator, demodulator, or modulator and demodulator (modem), as well as to do so at various levels of performance and cost according to the needs of the application.

In the gateway of a satellite communication system, a modem provides a variety of important functionality, including acting as a key portion of the link between the radiofrequency communication channel and a terrestrial network interface. Depending on the network and application, the needs of the system may vary significantly. For example, some designs may need to transmit or receive over different numbers of channels or bands, and different applications may require different data rates or amount of throughput. There is a need for an improved hardware design that can serve a wide variety of needs through different configurations to scale in performance and cost and meet varying system needs effectively. The techniques described herein provide a circuit board design for a modem for a satellite gateway, where the same circuit board architecture can be used in many different configurations and applications.

One of the ways that the circuit board achieves high versatility is through the configuration of sockets and interconnections. The circuit board can include a set of sockets for integrated circuits, such as field-programmable gate arrays (FPGAs) or other processors. For example, the circuit board includes two or more sockets for processors (e.g., FPGAs), where the circuit board enables processors in certain sockets to be used for different functions. For example, one processor socket had interconnections to enable a processor to serve as modulator or as a channelizer. Another processor socket has interconnections that enable a processor to serve as a modulator or a burst processor. As a result, depending on the configuration needed, the circuit board can be used as a modulator (e.g., with two processors acting as modulators), a demodulator (e.g., with two processors acting as a channelizer and a burst processor, respectively), or a modem (e.g., with two processors acting as a channelizer and a modulator, respectively). In these configurations, the same circuit board layout can be used, and optionally even the same FPGA processors may be used in different configurations, with changes to the FPGA bitstream or firmware providing differences in the way the processors in the different sockets function in the system.

The arrangement of processors can also provide features to provide scalable performance and high efficiency in the different configurations that the circuit board supports. For example, in addition to the two primary processor sockets noted above, the circuit board can include one or more additional processor sockets that can each perform processing for modulation and/or demodulation. For example, the circuit board can provide one or more additional sockets that can receive a processor to serve as a burst processor for demodulating transmission bursts. In the circuit board, each of these additional sockets can have a separate, direct data connection to the processor socket configured to receive a processor to act as a channelizer. That way, the results of the channelizer can be sent directly to different burst processor chips to handle the computationally intensive demands of demodulation, especially for demodulating many channels of received data concurrently. Depending on the design needs, more of fewer burst processors can be populated in the additional processor sockets, allowing the computational power to scale as needed to handle different amounts of expected demodulation load or system throughput. On the other hand, when the circuit board is used in a modulator-only configuration, the additional processor sockets need not be populated, which reduces component count and cost, and the only the two primary processor sockets can be populated, with both acting as modulators.

To facilitate load balancing and to avoid bottlenecks, the processor sockets (e.g., the primary two processor sockets and additional processor sockets) can be connected by the circuit board in a ring-type, bidirectional data bus. The ring bus can facilitate data transfer among the different burst processors, as well as provide additional paths to reach a main controller on the circuit board, e.g., a data path management system-on-a-chip (SoC). The two primary processor sockets can each have high-bandwidth data connections to the controller. The additional processor sockets, on the other hand, may not have these connections to the controller, but may nevertheless pass data over the ring bus so that demodulated data from any processor can be passed around the ring to either of the primary processor sockets to make use of the high-throughput connections these sockets have to the controller.

The circuit board can provide other options for customizability, such as the ability to populate components for different combinations of local area network (LAN) connections of different levels of throughput, for different numbers of output channels, and so on.

The techniques described herein can provide a number of advantages and benefits. For example, the techniques described herein enable a single circuit board design to be used for different application scenarios and multiple use cases. The techniques can achieve various performance goals with minimal changes to the components used. In many cases, the overall function set for device that includes the circuit board (e.g., function as a high-performance modulator, a high-performance demodulator, a modem, etc.) can be changed simply with an updated FPGA bitstream or firmware. In addition, the circuit board provides the ability to operate the circuit board in any of the key modes (e.g., modulator, demodulator, or modem) with only two FPGA processors, with the option to add additional processors to increase system performance. Further, the versatility in product configuration using the same circuit board design can avoid the need for testing different board designs, can reduce costs by allowing a common board to be shared in different products, and can improve the efficiency of system design.

In another general aspect, a communication device includes: a printed circuit board (PCB) comprising conductors routed to support a plurality of different configurations of modulation and/or demodulation functionality, the printed circuit board having: multiple analog output interfaces and one or more analog input interfaces, multiple digital network interfaces, and sockets for components including a controller, multiple processors, digital-to-analog converters (DACs), and an analog-to-digital converter (ADC). A first processor socket is coupled to receive output of the ADC, the first processor socket being arranged to receive a processor to function as a channelizer and provide data to any of multiple of the other processor sockets, such that one or more processors in the other sockets operate as a time division multiple access (TDMA) burst processor. A second processor socket is coupled to provide output to one or more of the DACs, such that second processor socket is arranged to receive a processor to function as a modulator for generating output to the DACs.

Implementations can include one or more of the following features.

In some implementations, the PCB provides a data connection to couple the first and second processor sockets to the controller socket.

In some implementations, one or more additional processor sockets each have a communication link to the first processor socket, wherein at least one of the additional processor sockets has a communication link to the second processor socket.

In some implementations, the PCB is configurable such that a processor in the first processor socket can be used as either a channelizer or as a modulator.

In some implementations, the PCB is configurable such that a processor in the second processor socket can be used as either a burst processor or as a modulator.

In some implementations, the PCB is configured to function as a demodulator with a processor in the first processor socket being configured as a modulator and a processor in the second processor socket being configured as another modulator.

In some implementations, sockets for the DACs are each populated with a DAC, and the socket for the ADC is not populated with an ADC.

In some implementations, the one or more additional processor sockets are not populated with a corresponding processor.

In some implementations, the PCB is configured to function as a demodulator with a processor in the first processor socket being configured as the channelizer and a processor in the second processor socket being configured as a burst processor.

In some implementations, the sockets for the DACs are not populated with a DAC, and the socket for the ADC is populated with an ADC.

In some implementations, the one or more additional processor sockets are each populated with a processor being configured as a burst processor.

In some implementations, the PCB is configured to function as a high-performance modem with a processor in the first processor socket being configured as a channelizer and a processor in the second processor socket being configured as a modulator.

In some implementations, one or more of the sockets for the DACs are each populated with a DAC, and the socket for the ADC is populated with an ADC.

In some implementations, the one or more additional processor sockets are each populated with a processor configured as a burst processor.

In some implementations, the PCB is configured to function as a low-performance modem with a processor in the first processor socket being configured as a channelizer and a processor in the second processor socket being configured as a modulator.

In some implementations, one or more of the sockets for the DACs are each populated with a DAC, and the socket for the ADC is populated with an ADC.

In some implementations, the communication device includes non-volatile memory storing one or more bitstreams for field-programmable gate arrays (FPGAs), the non-volatile memory being coupled to provide the bistreams to FPGAs in the first processor socket, the second processor socket, and each of the one or more additional processor sockets; and the one or more bitstreams are configured to configure an FPGA to function as at least one of a modulator, a channelizer, or a burst processor, and wherein the communication device is configured to use different bitstreams to initialize FPGAs in different processor sockets according to a configuration for the communication device.

In some implementations, the PCB supports a plurality of different configurations for the communication device, including to function as a modulator only, a demodulator only, or as a modem, wherein the different configurations are set by (i) populating different subsets of the sockets on the PCB and (ii) assigning different sets of bitstreams to program FPGAs in the processor sockets; and the PCB is configured such that in at least some of the different configurations different bitstreams are assigned to the FPGAs in at least the first processor socket and the second processor socket, such that selection of the bitstreams (i) selects between operating a processor in the first processor socket as a channelizer or as a modulator, and (ii) selects between operating a processor in the second processor socket as a burst processor or as a modulator.

In some implementations, the first processor socket, the second processor socket, and each of the one or more additional processor sockets are each connected using a ring bus that provides bidirectional communication for each link in the ring bus.

In another general aspect, a method includes: providing a printed circuit board (PCB) comprising conductors routed to support a plurality of different configurations of modulation and/or demodulation functionality, the printed circuit board having sockets for components including a controller, multiple processors, digital-to-analog converters (DACs), an analog-to-digital converter (ADC), and signal combiners, wherein the sockets for multiple processors comprise a first processor socket, a second processor socket, and one or more additional processor sockets; selecting a configuration from among the plurality of different configurations; selectively populating sockets of the PCB based on the selected configuration; selecting bitstreams for programmable processors in the processor sockets, including: selecting, for a programmable processor in the first processor socket, a bitstream from among a set of bitstreams that includes a bitstream for channelizer functionality and a bitstream for modulator functionality; and selecting, for a programmable processor in the second processor socket, a bitstream from among a set of bitstreams that includes a bitstream for modulator functionality and a bitstream for burst processor functionality; and storing the selected bitstreams to a memory coupled to the PCB to enable the programmable processors to operate according to the corresponding bitstreams selected for the processors.

In some implementations, the PCB provides a communication link from each of the one or more additional processor sockets each to the first processor socket, wherein the PCB provides a communication link from at least one of the additional processor to the second processor socket.

In some implementations, the plurality of different configurations comprise configurations in which different numbers of processors are used and configurations in which processors in the first processor socket and the second processor sockets are used for different modulation and demodulation functions.

The details of one or more implementations are set forth in the accompanying drawings and the description below. Other potential features and advantages will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
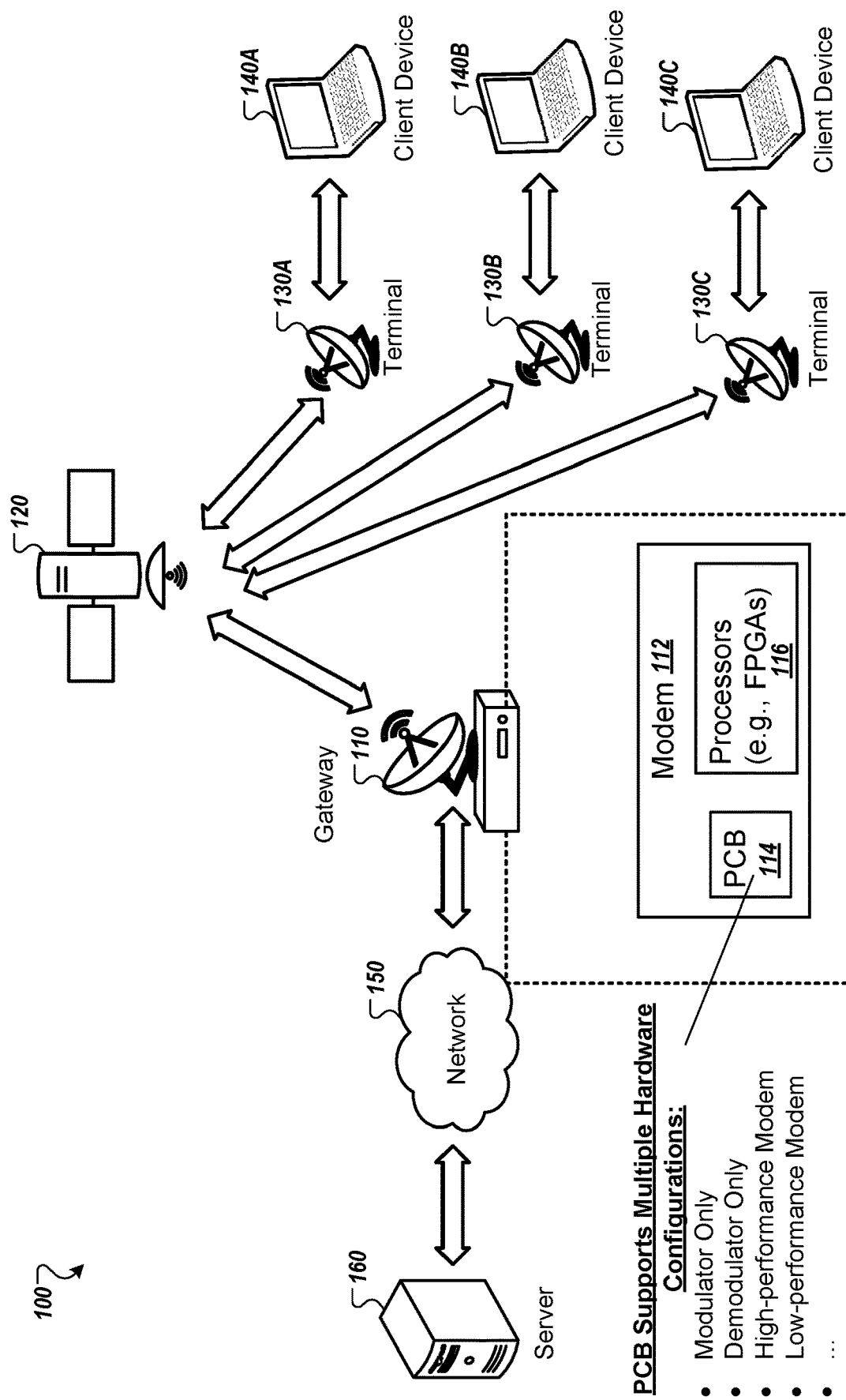
FIG. 1 is a block diagram that illustrates an example of a satellite communication system.

FIG. 1 is a block diagram that illustrates an example of a satellite communication system 100. In the example of FIG. 1, client devices 140A-140C each obtain network service through a connection with a corresponding satellite terminal 130A-130C. Each terminal 130A-130C communicates wirelessly with a satellite 120, which in turn communicates wirelessly with a terrestrial gateway 110. The gateway 110 then connects to a network 150 to provide data connections to remote servers and devices, for example, server 160. The network 150 can include public and/or private networks, and can include the Internet. The client device 140A-140C can be any appropriate device that can transfer data over a network, for example, a phone, a laptop computer, a desktop computer, a wearable device, etc.

In the system 100, the gateway 110 includes a communication device, such as a modem 112, that can provide various types of functionality. For example, the modem 112 can have a circuit board, such as a printed circuit board (PCB) 114, that can be configured in any of various ways to meet different system needs. In some examples, the communication device with the PCB 114 can be configured to serve as a modulator only, a demodulator only, or a high-performance modem, or a low-cost modem. The same PCB 114 can be used in any of these configurations without changes to the layout or interconnections of the PCB 114. The PCB 114 can include sockets to receive one or more processors, such as field-programmable gate arrays (FPGAs) 116 and other hardware components (not shown). The different configurations that are possible using the PCB 114 can be achieved by selectively populating different sockets or portions of the PCB 114 according to the desired capabilities of the device, as well as by providing the appropriate FPGA bitstreams or firmware for the functions selected.

The PCB 114 can support multiple hardware configurations to provide different sets of functionality. Although the PCB 114 is used in a modem 112 in FIG. 1, the same PCB 114 and FPGAs 116 can alternatively be used in other configurations. The PCB 114 includes a set of sockets, with each socket providing an area to receive a corresponding to an integrated circuit or other hardware component. The traces and interconnections in the PCB 114 that connect the various sockets are arranged in a manner that facilitates the multiple configurations that are possible.

Figure 2:
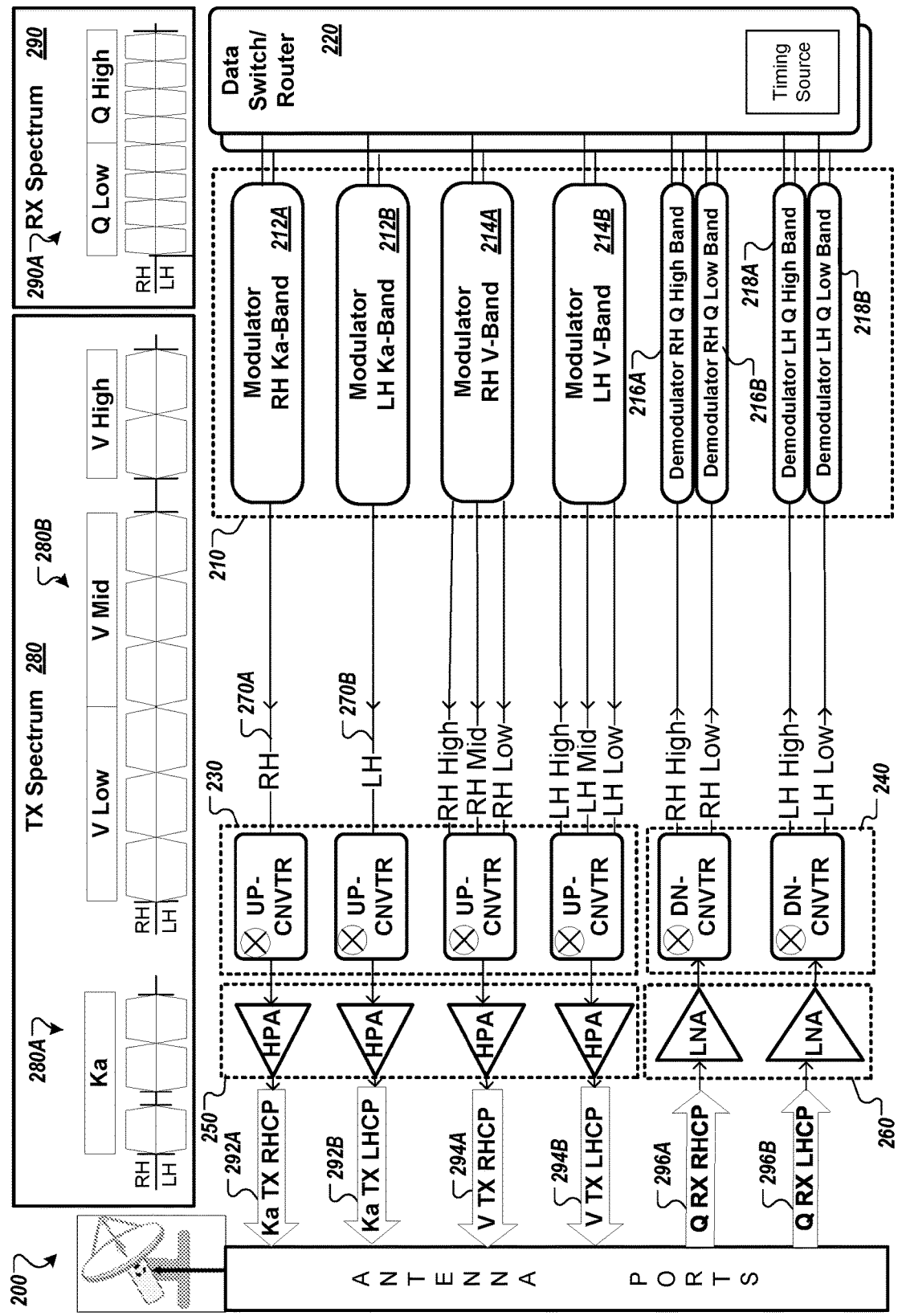
FIG. 2 is a diagram that illustrates an example of a gateway in a satellite communication system.

FIG. 2 is a diagram that illustrates an example of a gateway 200 in a satellite communication system. The gateway 200 can transmit and receive data in different bands of the electromagnetic spectrum. In the example, the gateway 200 is configured to transmit on four bands and to receive on two bands. To provide the modulation and demodulation functions of the gateway 200, the PCB 114 can be used in different configurations to provide the needed capabilities a compact and efficient manner that reuses the same PCB 114 design.

For example, each instance of the PCB 114 may be able to perform modulation on up to two bands and to perform demodulation on one band. The gateway 200 has four bands for transmission and two bands for reception, and so the modulation and demodulation needs of the gateway can be satisfied using four devices each using a different copy of the PCB 114:

a first modem, providing (i) two modulators for the Ka band (e.g., a right-hand circular polarization (RHCP) Ka-band modulator 212A and a left-hand circular polarization (LHCP) Ka-band modulator 212B, and (ii) one demodulator, such as a RHCP Q high band demodulator 216A;

a second modem, providing (i) two modulators for the V band (e.g., a RHCP V-band modulator 214A and a LHCP V-band modulator 214B) and (ii) one demodulator, such as a right-hand (RH) Q low band demodulator 216B;

a first demodulator, such as a LH Q high band demodulator 218A.

a second demodulator, such as a LH Q low band demodulator 218B.

As a result, the entire modulation and demodulation capability for the gateway 200 can be provided with four copies of the PCB 114, two in a modem configuration and two in a demodulator-only configuration to minimize cost and power consumption.

In the example, the transmission spectrum 280 includes ranges of frequencies in a Ka band 280A and in a V band 280B. The V band 280B is split into three different ranges: the V low band, the V middle band, and the V high band. The receiving spectrum 290 includes frequency ranges in the Q band 290A in two different ranges: Q low band and Q high band.

In some implementations, the Ka-band modulators, e.g., the RH Ka-band modulator 212A and the LH Ka-band modulator 212B, can receive digital signals from the terrestrial digital network, such as Internet, through the data switch/router 220. The RH Ka-band modulator 212A and LH Ka-band modulator 212B can modulate the digital signals. After modulation, the RHCP Ka-band modulator outputs modulated signals 270A. The LHCP Ka-band modulator outputs modulated signals 270B. The output modulated signals 270A and modulated signals 270B are converted from a low frequency to the Ka band using corresponding up-converters 230. The up-converted signals are amplified using a corresponding high power amplifier (HPA) 250. After the power amplification, the amplified signals in the Ka band are input into a Ka-band right-hand circular polarization (RHCP) antenna port 292A and a Ka-band left-hand circular polarization (LHCP) antenna port 292B, respectively. The amplified signals can be transmitted to the satellites using the antenna.

In some implementations, the V-band modulators, e.g., the RH V-band modulator 214A and the LH V-band modulator 214B, can perform a similar process as Ka-band modulators. For example, The RH V-band modulator 214A and LH V-band modulator 214B can convert the digital signals received from the terrestrial digital network, such as Internet, through the data switch/router 220. Each of the RH V-band modulator 214A and the LH V-band modulator 214B can output modulated signals in three sub-bands, including V low band, V middle band, and V high band. The modulated RH and LH signals designated for transmission on the V low band, V middle band, and V high band can be converted to a higher frequency using the corresponding up-converters 230. The up-converted signals can be amplified using the HPAs 250. The amplified V-band signals are input into a corresponding V-band antenna port, such as a V-band RHCP antenna port 294A or a V-band LHCP antenna port 294B.

In some implementations, for down-link communication, data from satellites can be received in receiving spectrum through one or more antenna ports. For example, Q-band signals can be received on Q-band RHCP antenna port 296A and/or Q-band LHCP antenna port 296B. The received signals are processed by corresponding low noise amplifiers (LNAs) 260. The low noise amplifier 260 can amplify a low-power signal into higher power without significantly degrading the signal-to-noise ratio. The amplified signals for different Q sub-bands can be processed by corresponding down-converters 240. The down-converter 240 can convert a band-limited signal to a lower frequency signal at a lower sampling rate in order to simplify the subsequent radio stages. The down-conversion can preserve the information in the frequency band of interest of the original signal. The down-converted signals can include signals from the RH and LH channels. For example, the signals can include those down-converted from the RH Q low band and RH Q high band, which are demodulated by the RH Q-band demodulators, e.g., RH Q high band demodulator 216A and RH Q low band demodulator 216B. The signals can include signals down-converted from the LH Q low band and LH Q high band, which are demodulated by the LH Q-band demodulators, e.g., the LH Q high band demodulator 218A and LH Q low band demodulator 218B. In some examples, the demodulated signals are digital signals that can be transmitted to the network via the data switch/router 220.

Figure 3A:
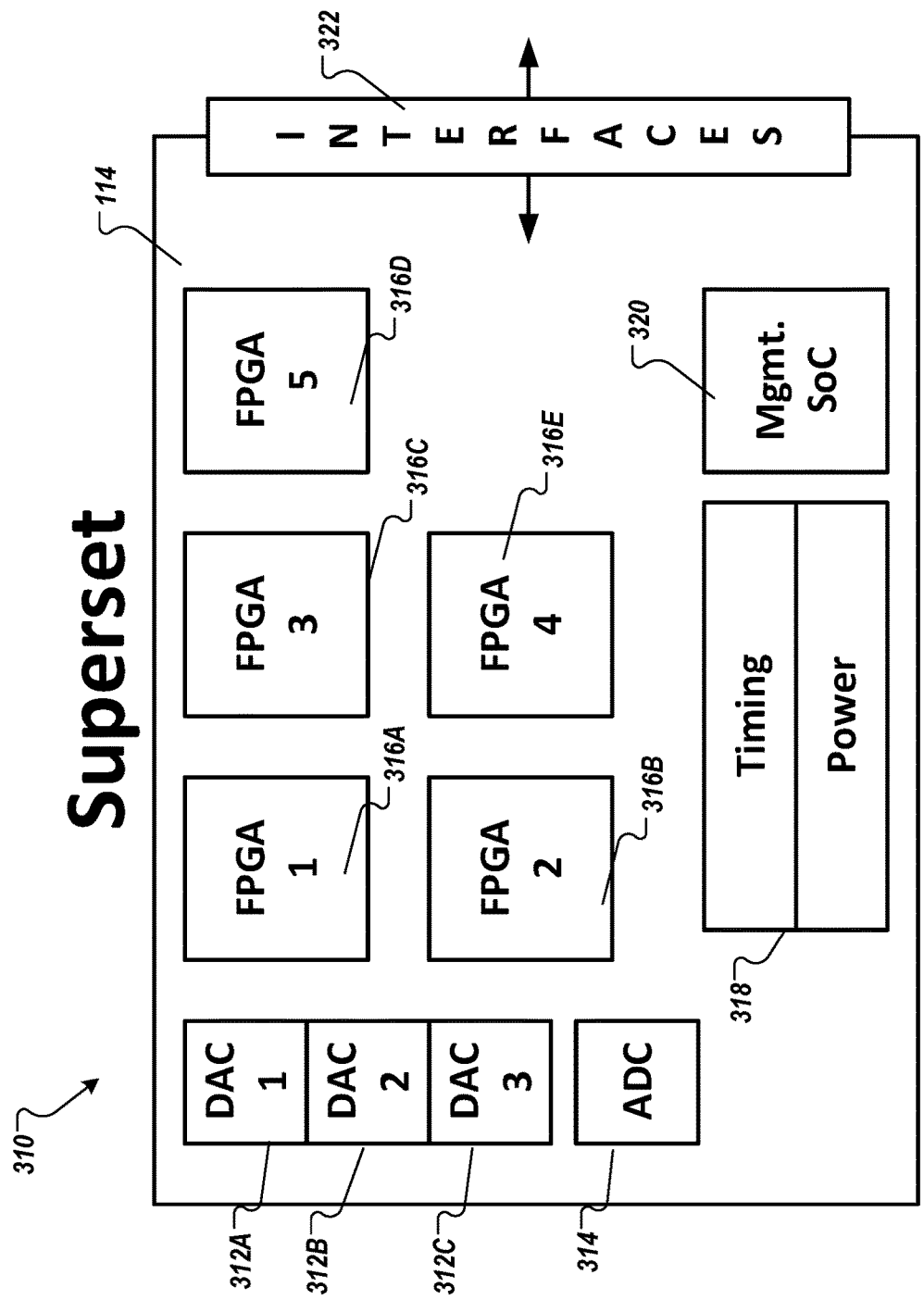
FIGS. 3A-3B are diagrams that illustrate an example of a printed circuit board (PCB) that supports multiple configurations having different capabilities.
Figure 3B:
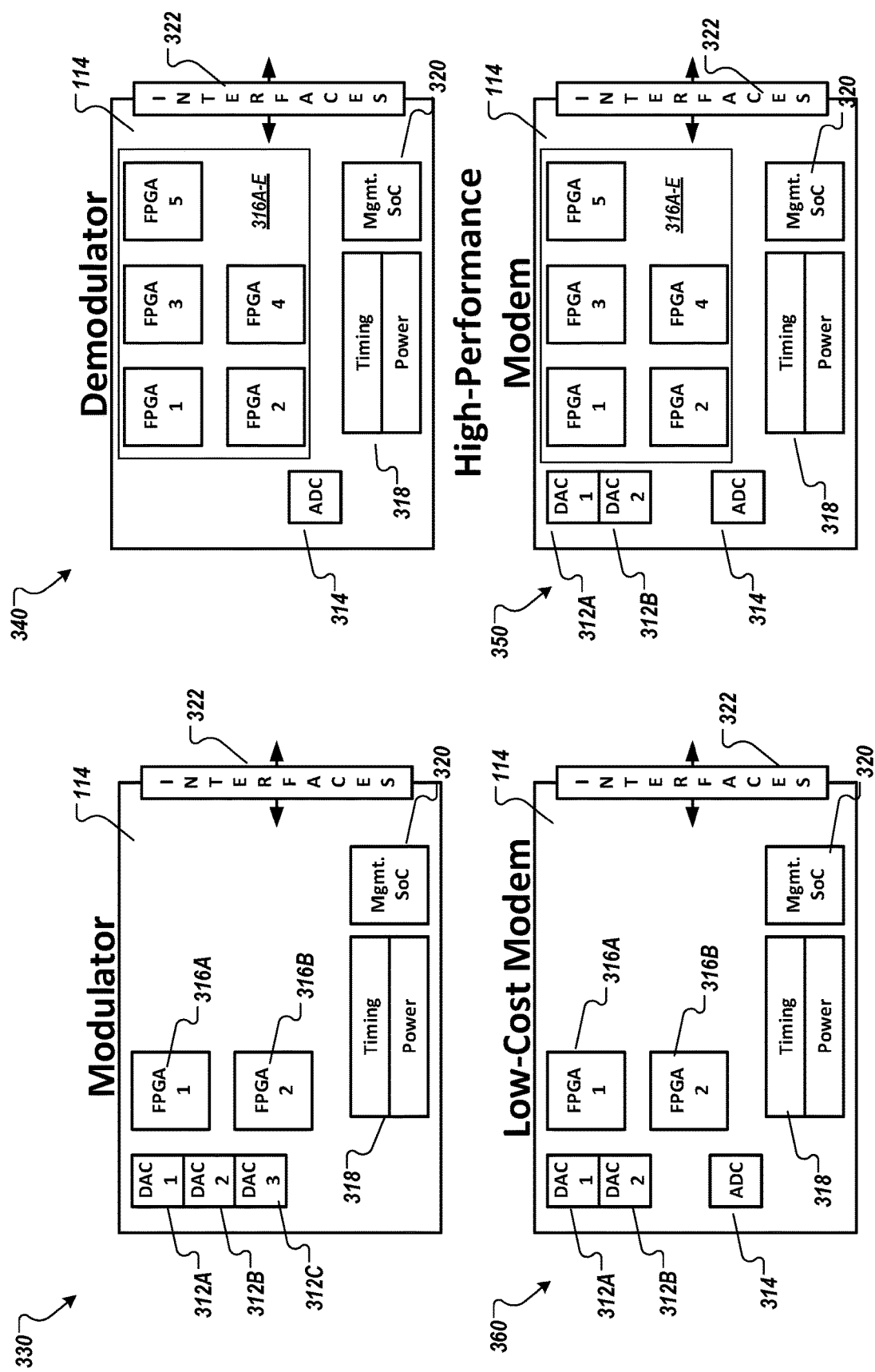

FIGS. 3A-3B are diagrams that illustrate an example of the PCB 114 that supports multiple different configurations that provide different sets of functionality. The PCB 114 can include conductors (e.g., signal traces, etc.) routed to support multiple different configurations 330, 340, 350, 350 of modulation and/or demodulation functionality.

The example configuration 310 shows the PCB 114 populated with a superset of components that combines components used in all of the other configurations 330, 340, 350, 350. Although the PCB 114 and the interconnections in the PCB 114 do not change in the various configurations 330, 340, 350, 350, different subsets of the features offered by the PCB 114 are used, resulting in the different sets of elements shown for those configurations.

The PCB 114 has various different sockets or landing areas to receive an integrated circuit or other component. As used herein, a socket can refer to any of various different regions of a PCB used to receive an integrated circuit or other component, such as land grid array (LGA) socket, a ball grid array (BGA) socket, a pin grid array (PGA) socket, a leadless chip carrier (LCC) socket, a plastic-leaded chip carrier (PLCC) socket, and so on. In some cases, a socket may simply refer to a grid or other arrangement of electrical contacts, such as solder bumps, solder balls, lands, or pads, in a region of the PCB 114. The socket may be arranged for direct soldering of a component to the region. In each of the examples discussed below, the PCB 114 can have the same set of sockets, e.g., the landing areas to receive components, with those areas connected by traces and interconnections among components on the PCB 114. However, not all of the sockets are populated in each configuration 330, 340, 350, 360. The differences in the subsets of sockets that are populated with integrated circuits or other components is a significant difference among the configurations 330, 340, 350, 360.

The superset configuration 310 shows elements populated in each of the major sockets of the PCB 114. For each of the elements shown, the PCB 114 can have a corresponding socket or landing area to operatively couple an integrated circuit or other component as shown. For example, the superset configuration 310 demonstrates that three sockets 312A-312C are configured to each receive a digital-to-analog converter (DAC), and these are populated with DAC1, DAC2, and DAC3. The superset 310 also shows that a socket 314 to receive an analog-to-digital convertor (ADC) is populated with an ADC. The superset 310 further includes five processor sockets 316A-316E each configured to receive a field-programmable gate array (FPGA), and these are populated with chips FGPA1, FGPA2, FGPA3, FGPA4, and FGPA5. As discussed below, the PCB 114 may include interconnections so that the processors in the sockets 316A-316E can be used for different functions, as a modulator, a channelizer, or a burst processor, depending on the type of device the PCB 114 is used in. The superset 310 further includes a socket 318 to receive a timing and power control elements. The superset 310 further includes a socket 320 to receive a controller, e.g., management system on a chip (SoC). The superset 310 further includes interfaces 322 for digital networks (e.g., for transmission of user data over a core network) as well as interfaces for configuration or management of the modem or other device using the PCB 114.

The PCB 114 can be flexibly configured to meet various system needs. For example, the PCB 114 can be configured to function as a modulator 330, a demodulator 340, a high-performance modem 350, or a low-cost modem 360. In all of these configurations, the socket 318 is populated with the timing and power control chips, and the socket 320 is populated with the controller or management SoC. These designs all also include components to provide data interfaces 322, although as discussed further below the types and amounts of these interfaces may vary from one configuration to the next.

For the modulator-only configuration 330, a subset of the sockets of the PCB 114 are populated with hardware components. For example, the sockets 312A-312C are each populated with a respective DAC, e.g., DAC1, DAC2, and DAC3. This configuration can provide the ability to concurrently modulate for transmission on three different bands or sub-bands. Only two of the five processor sockets 316C-316E are populated, since modulation is not a processing intensive as demodulation. The processor sockets 316A and 316B are populated with FPGA1 and FPGA2, respectively, and both FPGAs serve as modulators. The socket 314 from the 310 is not populated with an ADC, as the configuration 330 does not need or provide demodulation or reception capabilities.

In the demodulator-only configuration 340, a different subset of sockets are used and populated with the corresponding hardware components. For example, all the sockets receive a corresponding hardware component, except the DAC sockets 312A-312C, which are not populated with DACs because transmission capability is not needed in this configuration 340. This configuration uses one FPGA as a channelizer and the remaining four FPGAs as burst processors, to provide high capacity for reception.

In the high-performance modem configuration 350, another different subset of sockets is populated with the corresponding hardware components. For example, all the sockets receive a corresponding hardware component, except the DAC socket 312C, which is not populated with a DAC. This configuration provides modulation for two bands or sub-bands, rather than the maximum amount of three bands or sub-bands for which the PCB 114 can support concurrent transmission. This is a result of the typical processing limitations of the FPGA processors.

In the example configuration 350, only a single FPGA would be used as a modulator, and would be able to support modulation on two but not three bands or sub-bands concurrently. The remaining four FPGAs would be used to perform the channelizer and burst processor functions for the more computationally demanding demodulation process. Nevertheless, depending on the capabilities of the FPGAs used and the desired throughput for reception and transmission, the modulation and demodulation functions may be spread among more of the FPGAs or balanced differently (e.g., with two FPGAs for modulation and three for demodulation, rather than one for modulation and four for demodulation). This can enable greater numbers of modulation and demodulation channels supported concurrently.

As discussed below with respect to FIGS. 4A-4E, the traces of the PCB 114 that provide data connections among the processors facilitate these different configurations, as well as dynamic load balancing and redundant data connections to the main controller or management SoC. For example, the processor socket that has a direct link to the ADC to receive input signal samples can have a direct data link to each of the other processor sockets, enabling each of the other processors to efficiently serve as burst processor to support reception, without requiring the latency of data to be passed among the processors. Nevertheless, in addition to these data links, the processor sockets can also be arranged with a ring bus (e.g., with each processor socket having a direct connection with two other processors in the ring). This ring bus can facilitate load balancing among the processors as well as allow output data (e.g., decoded user data resulting from burst processing) to be routed through the ring to any of multiple connections to the main controller or management SoC. This can ensure that high-throughput connections for output data, even if the data link between the channelizer and the controller is saturated or otherwise impaired.

In the low-cost modem configuration 360, another subset of sockets of the PCB 114 is populated with the corresponding hardware components. For example, the socket 314 is populated with an ADC. The sockets 312A and 312B are populated with DAC1 and DAC2, respectively, while the socket 312C is not populated with a DAC. This signifies that the modem 360 is capable of transmission on two bands concurrently but not the maximum three bands that would be possible if a third DAC and related components were included. The sockets 316A and 316B are populated with FPGA1 and FPGA2, respectively, providing the minimum level of functionality for a modem. In other words, one FPGA in a socket connected to the DACs can provide the modulation capability, while another FPGA in a socket connected to the ADC can provide channelizer capability for demodulation. One or both of the FPGAs can perform the burst processing on the output of the channelizer. The sockets 316C-316E are not populated with an FPGA.

FIGS. 4A-4E show the superset 310 and configurations 330, 340, 350, 360 in greater detail. In particular, FIGS. 4A-4E show the data connections that are built into the PCB 114 through signal traces or other conductors.

Figure 4A:
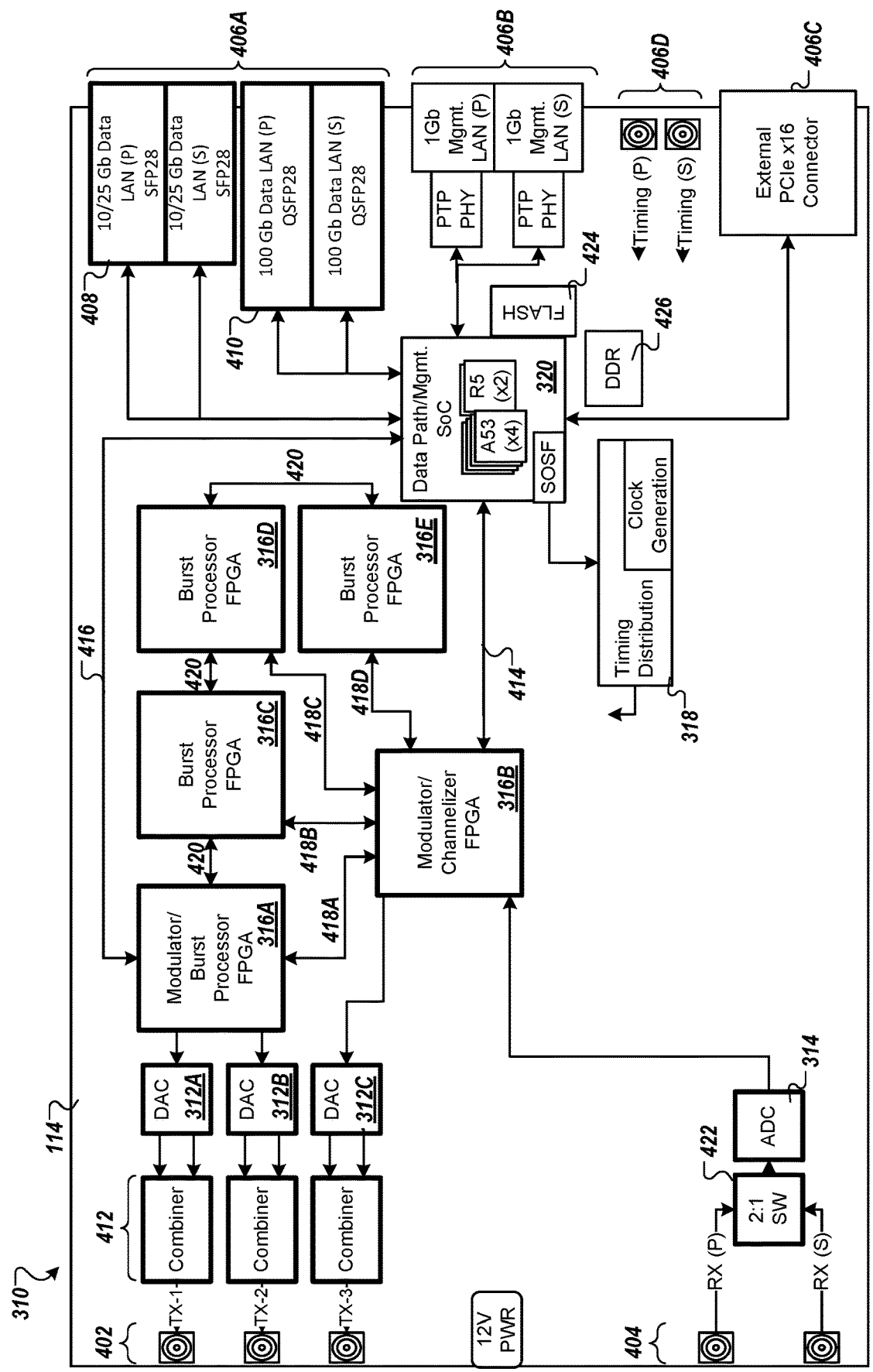
FIG. 4A is a diagram that illustrates an example of the PCB with all elements populated, to show a superset of functions and options offered by the PCB.

FIG. 4A illustrates the PCB 114 populated for the superset configuration 310, showing all sockets or areas populated and with the maximum capabilities provided by the PCB 114. The features of the PCB 114 described for this configuration are shared across the other configurations 330, 340, 350, 360, although different configurations populate different sets of components onto the PCB 114 and use different subsets of the features the PCB 114 provides. As illustrated, the PCB 114 provides multiple analog interfaces 402, 404, multiple digital network interfaces 406A, 406B, and sockets for components including a controller, multiple processors, digital-to-analog converters (DACs), an analog-to-digital converter (ADC), and signal combiners.

The left side of the PCB 114 shows analog interfaces and supporting components. To facilitate data transmission, the PCB 114 provides for transmission on three paths, so the PCB 114 can support concurrent transmission on three bands or subbands. This is shown with the three digital-to-analog converter (DAC) sockets 312A-312C with DACs, each coupled to a corresponding socket 412 populated with a signal combiner, which provides output to a corresponding analog output interface 402, such as a port to connect to additional components of a transmit chain, such as an upconverter and a power amplifier. In some implementations, each of the signal combiners in sockets 412 can receive the analog signals output by a DAC and combine different signals into a single output, so that multiple signals can be transmitted over a single medium. The combined analog signals from the signal combiners can be further transmitted to multiple analog output interfaces 402, through which the combined analog signals can be transmitted to the satellites in an up-link communication. In the example, three different transmit paths are shown, but other implementations may provide more or fewer than this.

In some implementations, the PCB 114 can include duplicated structures, e.g., with multiple sockets 312A-312C for DACs, multiple sockets 412 for signal combiners, and multiple analog output interfaces 402 to provide redundancy. For example, each DAC in the sockets 312A-312C can output analog signals that are combined by a corresponding signal combiner in the socket 412, and transmitted through a corresponding analog output interface 402. As a result, duplicated structures of multiple sockets 312A-312C for DACs, multiple sockets 412 for signal combiners, and multiple analog output interfaces 402 can provide redundancy. The redundancy can improve the reliability of the system. For example, if one analog signal through one DAC, one combiner, and one analog output interface is not successfully transmitted, there are other analog signals through other DACs, combiners, and analog output interfaces to provide data to the satellites The PCB 114 provides one or more analog input interfaces 404 that can receive analog input to be demodulated. The example shows two input paths a primary (P) input and secondary (S) input, that are both coupled to a socket 422 populated with a switch that is used to control which analog input to process. The switch in the socket 422 can be used to select between two analog signal sources, e.g., to provide signals from only one of the primary or secondary inputs on to an ADC in socket 314. The analog signals from the switch are further processed by the ADC, which converts the analog signals into digital signals.

The PCB 114 shown in the example has five processor sockets 316A-316E, each configured to receive an FPGA. One processor socket 316A is connected with data traces to the DAC sockets 312A, 312B, as the processor socket 316A for the primary processor to handle modulation. The PCB connections among processor sockets enable FPGAs in one or more other sockets 316B-316E to also share the modulation processing load. Another processor socket 316B is connected with data traces to the ADC socket 314, as the processor socket 316B for the primary processor to handle demodulation. The PCB connections among processor sockets enable FPGAs in one or more other sockets 316A, 316C-316E to also share the demodulation processing load. The PCB 114 can include conductors to separately couple the socket 316B and socket 316A with the socket 320 for the controller. For example, the processor socket 316B and the controller socket 320 are connected with communication link 414, enabling the controller to send data from a network to be modulated and transmitted. The processor socket 316A and the controller socket 320 are connected with communication link 416, enabling the processor to send demodulated data extracted from received signals to the controller to pass on to a data network.

In further detail, the processor socket 316B is arranged to receive output of the ADC for demodulation. The processor socket 316B is arranged to receive a processor, such as an FPGA, that is configurable to at least function as a channelizer for demodulation. The connections in the PCB 114 enable a processor in the socket 316B to be alternatively used as a modulator, although it is not used in this manner in the configuration 310.

The PCB 114 can include signal traces to connect the socket 316B to each of the other processor sockets 316A, 316C, 316D, and 316E. The PCB 114 includes communication links 418A-418D (e.g., sets of signal traces) from the processor socket 316B to each of the other processor sockets 316A, 316C-316E. For example, the socket 316B and the socket 316A are connected over a communication link 418A. In addition, one or more additional processor sockets, such as 316C, 316D, and 316E, each have a communication link 418B, 418C, and 418D, to the processor socket 316B. This provides a direct data path for processor in the socket 316B to distribute burst processing tasks to the processors in the other processor sockets 316A, 316C-316E. These connections provide the ability to perform a high degree of parallelism in the decoding process, with one or more processors in the other processor sockets 316A, 316C-316E operating as a time division multiple access (TDMA) burst processor. The FPGAs acting as burst processors can provide demodulation results to the processor in the socket 316B, which has the communication link 414 to the controller socket 320 and so can pass on the received data.

The processor socket 316A is coupled to provide output to one or more of the DACs in the sockets 312A-312C. The processor socket 316A is arranged to receive a processor configurable to at least function as a modulator for generating output to be transmitted to the DACs. The connections in the PCB 114 enable a processor in the socket 316A to be alternatively used as a burst processor, although it is not used in this manner in the configuration 310. Because the processor sockets 316A and 316B have separate data links 416, 414 to the controller, the data to be transmitted and the data received can be efficiently processed at high throughput.

The additional processor sockets 316C, 316D, and 316E are provided to receive optional additional processors. The PCB 114 can operate as a modem with processors in only the processor sockets 316A and 316B, but processors in the additional processor sockets 316C, 316D, and 316E can serve a burst processors to increase the demodulation capacity provided. Each processor socket 316A-316E is connected to at least two other processor sockets 316A-316E. The sockets 316A-316E are connected in a ring bus arrangement, with bidirectional communication for each link in the ring. The ring bus can facilitate data transfer among the different FPGAs used as burst processors. In addition, the ring provides an additional path to provide data to the controller. The two primary processor sockets 316A, 316B can each have dedicated high-bandwidth data connections to the controller socket 320. The additional processor sockets 316C-316E, on the other hand, do not have these connections to the controller. Nevertheless, processors in the additional processor sockets 316C-316E can use the ring to pass received data to either of the primary processor sockets 316A, 316B to make use of the high-throughput connections these sockets 316A, 316B have to the controller. For example, the burst processors may typically provide demodulated data to the processor in socket 316B, through the connections 418A-418D, to be passed to the controller. However, the burst processors can additionally or alternatively pass data to the controller through the ring bus to the processor in the socket 316A, to be passed to the controller through the connection 416.

The communication links 418A-418D between the processor socket 316B and each of the other processor sockets 316A, 316C-316E enable a ring bus to be provided for any combination of additional processors in the sockets 316C-316E. When all of the processor sockets 316A-316E are populated, as shown in FIG. 4A, the ring bus is provided using communication links 418A, 418D, and communication links 420. However, if only four FPGAs are used (e.g., not all five are needed for the intended throughput or application), then the processor socket 316E is not populated, and the ring bus can be provided among the four processor sockets 316A-316D using communication links 418A, 418C, and two of the communication links 420 (e.g., between processor sockets 316A and 316C, and between processor sockets 316C and 316D). Similarly, if only three FPGAs are needed, the processor sockets 316D and 316E are left empty, and the ring bus can be provided among processor sockets 316A-316C using communication links 418A, 418B and a single communication link 410 between processor sockets 316A and 316C. Thus the ring bus can be provided for multiple different numbers of processors, or even for all of the different numbers of processors that the device allows.

In some implementations, the communication links 416, 418A-418D, 420 use a high-bandwidth, high-reliability data connection, such as a connection according to the Interlaken connection protocol. Different widths or numbers of lanes may be used for different types of connections, such as a 50 Gb/s connection for the communication links 416, 418A-418D, a 25 Gb/s connection for the communication links 420, a 100 Gb/s connection between the processor socket 316B and the controller SoC 320, etc. The connections between the processor sockets 316A, 316B and the sockets for DACs 312A-312C and the socket for the ADC 314 can be a serial interface for communication between data converters (ADCs and DACs) and logic devices. For example, each communication link can include multiple lanes (e.g., 4, 8, 12, etc.) according to the JESD204B standard, or can use another interface type.

As discussed further below, the PCB 114 enables different configurations such that a processor in the socket 316B can be used as either a channelizer or as a modulator. For example, the socket 316B can receive a processor, such as an FPGA, that is configurable to function as a channelizer or as a modulator (e.g., using different FPGA bitstreams and/or firmware), and the PCB 114 provides the connections to support both options. Furthermore, the PCB 114 connects the elements such that a processor in the socket 316A can be used either as a modulator or as a burst processor. For example, the socket 316A can receive a processor, such as an FPGA, that is configurable to function either as a modulator or as a burst processor (e.g., using different FPGA bitstreams and/or firmware), and the PCB 114 provides the connections to support both options.

To receive input signals, the digital signals output by the ADC in the socket 314 can be processed by a processor (e.g., FPGA) acting as a channelizer in the socket 316B. In some implementations, the received signals can include signals of multiple channels that share the transmission medium with a TDMA method. The channelizer may divide the signals into the respective channels and distribute the signals to burst processors in the sockets 316A, 316C, 316D, and 316E, for further processing.

In some implementations, the controller in the socket 320 can be a system-on-a-chip (SoC) that manages the data path in the PCB 114. The controller can be connected to the multiple digital network interfaces 406A. These interfaces 406A can provide data to be modulated and transmitted via the satellite, and the controller can output data received and demodulated using the PCB 114 over the interfaces 406A. For example, the controller can receive data to be transmitted to user terminals via the satellite network from the multiple digital network interfaces 406A. The data can be processed by one or more of the multiple processors in the sockets 316A-316E acting as a modulator before being passed to the DACs, signal combiners, and output through the analog output interfaces 402.

To receive data over the satellite link, after the analog signals are received though the one or more analog input interfaces 404, the analog signals are converted to digital signals by the ADC and further processed by one or more of the multiple processors in the sockets 316A-316E. The controller in the socket 320 can receive the data that is obtained from the received signals, and the controller can output the received data through the multiple digital network interfaces 406A.

The multiple digital network interfaces 406A can include digital interfaces that connect to a network, such as a local area network, a core network, or the Internet, to provide data connections with remote servers and devices. For example, the digital network interfaces 406A can connect to routers, data switches, and the like, of the network. In some implementations, the PCB 114 supports different types of digital network interfaces 406A having different levels of data throughput. For example, a first pair network interfaces 408 each have a bandwidth of 10 or 25 gigabits per second (Gb), e.g., an optical link such as a small form-factor pluggable 28 (SFP28) interconnect. In addition, a second pair of network interfaces 410 each have a bandwidth of 100 Gb, e.g., an optical link such as a quad small form factor pluggable 28 (QSFP28) interconnect. Depending on the application that the PCB 114 will be used in, the faster or slower pair may be used, or both may be supported. Providing the network interface in pairs can provide redundancy to increase reliability.

In some implementations, the controller in the socket 320 can be connected with digital interfaces 406B for management of the device that includes the PCB 114. Unlike the interfaces 406A which are primarily for transferring incoming or outgoing data, the interfaces 406B can be dedicated for providing status information about the device, receiving configuration updates for the device, and otherwise facilitating monitoring and configuration changes for the device.

In some implementations, the controller use a precision time protocol (PTP) provided using the digital interfaces 406B. The PTP is a protocol used to synchronize clocks throughout a computer network. On a local area network, it achieves clock accuracy in the sub-microsecond range, making it suitable for measurement and control systems. In some implementations, the digital interfaces 406B can include multiple interfaces to provide redundancy. For example, as shown in the figure, there are two digital interfaces 406B that connect to the same management network with a bandwidth of 1 Gb.

In some implementations, the controller in the socket 320 can be connected with an external interface 406C, such as an optional peripheral component interconnect express (PCIe) connector. The interface 406C can provide connection of the PCB 114 in a host system, with the PCB 114 being connected as a PCIe card.

In some implementations, the PCB 114 can include one or more analog timing synchronization input interfaces 406D. The analog timing synchronization input interfaces 406D can include at least two interfaces, e.g., a primary interface and a secondary interface, to provide redundancy. The timing synchronization interfaces 406D can be used to synchronize timing among multiple PCBs 114 and/or with other devices.

In some implementations, the PCB 114 can include one or more sockets 424 to receive one or more flash memory devices for non-volatile storage, and the PCB includes one or more sockets 426 to receive random access memory (RAM). The non-volatile memory can store software and firmware of the device, and the RAM can be used by the controller for various purposes. In some implementations, the timing and power control chip in the socket 318 of the PCB 114 can include a clock generator that produces a clock signal for use in synchronizing operation of components on the PCB 114. The clock generator can be connected with the controller in the socket 320 for timing distribution.

Figure 4B:
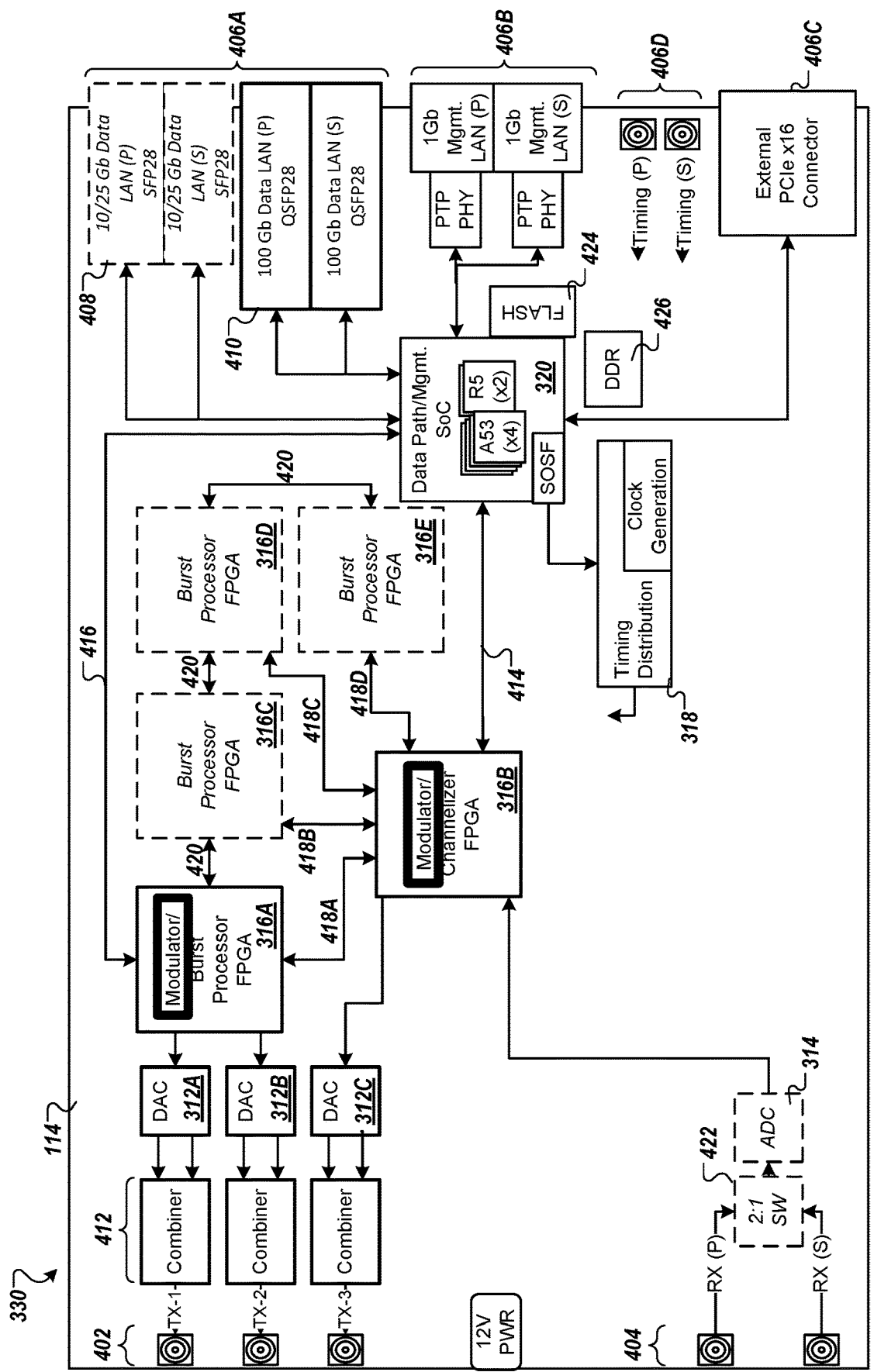
FIG. 4B is a diagram that illustrates an example configuration that uses the PCB in a modulator.

FIG. 4B is a diagram that illustrates a modulator only configuration 330 using the PCB 114. To use the PCB 114 in a modulator, a subset of the sockets are selected and populated with corresponding hardware components. For example, in the modulator configuration 330 for the modulator, the processor socket 316B receives a processor, such as an FPGA, that is configured as a modulator, and the socket 316A receives a processor, such as an FPGA, that is configured as another modulator. The other sockets 316C, 316D, and 316E do not receive any processors. The sockets 312A-312C are each populated with a DAC, allowing modulation for three different output bands or sub-bands. In the modulator configuration 330, the ADC socket 314 does not receive an ADC, since reception and demodulation are not needed. The PCB 114 is populated with hardware for the higher-bandwidth network interfaces 410 (e.g., rather than the network interfaces 408) to support a high throughput of data to be transmitted.

In operation, the controller in the socket 320 receives data from the network interfaces 410 and the controller provides this data to the processors sockets 316A, 316B over the communication links 414, 416. The processors in the sockets 316A, 316B are configured to operate as modulators and provide modulated digital output to the DACs in the sockets 312A, 312B, and 312C for conversion to analog signals. The resulting analog signals can be provided to other components in the transmit chain through the analog output interfaces 402 for transmission to a satellite in an up-link communication.

Figure 4C:
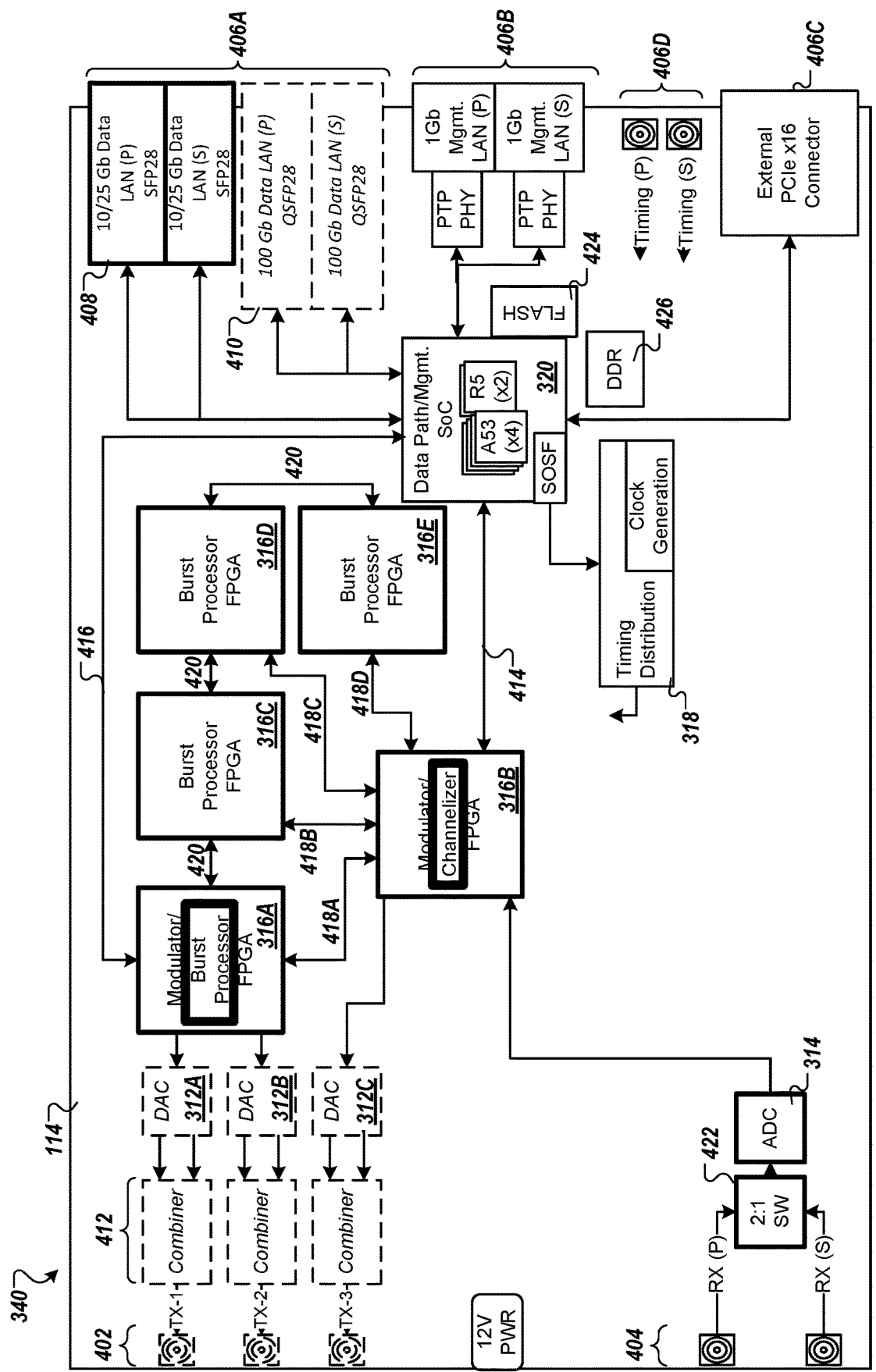
FIG. 4C is a diagram that illustrates an example configuration that uses the PCB in a demodulator.

FIG. 4C is a diagram that illustrates the demodulator-only configuration 340 using the PCB 114. To configure the PCB 114 to function as a demodulator, a subset of the sockets are selected and populated with corresponding hardware components. For example, in the demodulator configuration 340 illustrated, the design is configured to handle a high data throughput, and so an FPGA is populated in each of the processor sockets 316A-316E. The processor in the socket 316B is configured as a channelizer, while the processors in the other processor sockets 316A, 316C-316E are each configured as a burst processor. In the demodulator configuration 340, transmission and modulation capability is not needed, so sockets 312A-312C do not receive DACs. The demodulator provides output through the network interfaces 408 with a lower bandwidth, e.g., 10/25 GB bandwidth, as the higher bandwidth of the interfaces 408 is not needed.

In the demodulator configuration, the ADC socket 314 receives an ADC and similarly a switch is provided in the socket 422. The ADC in the socket 314 receives analog signals through the one or more analog input interfaces 404 from the satellites in a down-link communication. The ADC can convert the analog signals into digital signals and transmit the digital signals to the channelizer in the socket 316B. The received signals can include signals of multiple channels that share the transmission medium with a TDMA method. The channelizer may divide the signals into specific channels and can distribute the signals of different channels among the burst processors in the sockets 316A, 316C-316E, for further processing to extract the data received. The controller in the socket 320 can receive the output data extracted and can further transmit the received data to the network over the network interfaces 408.

Figure 4D:
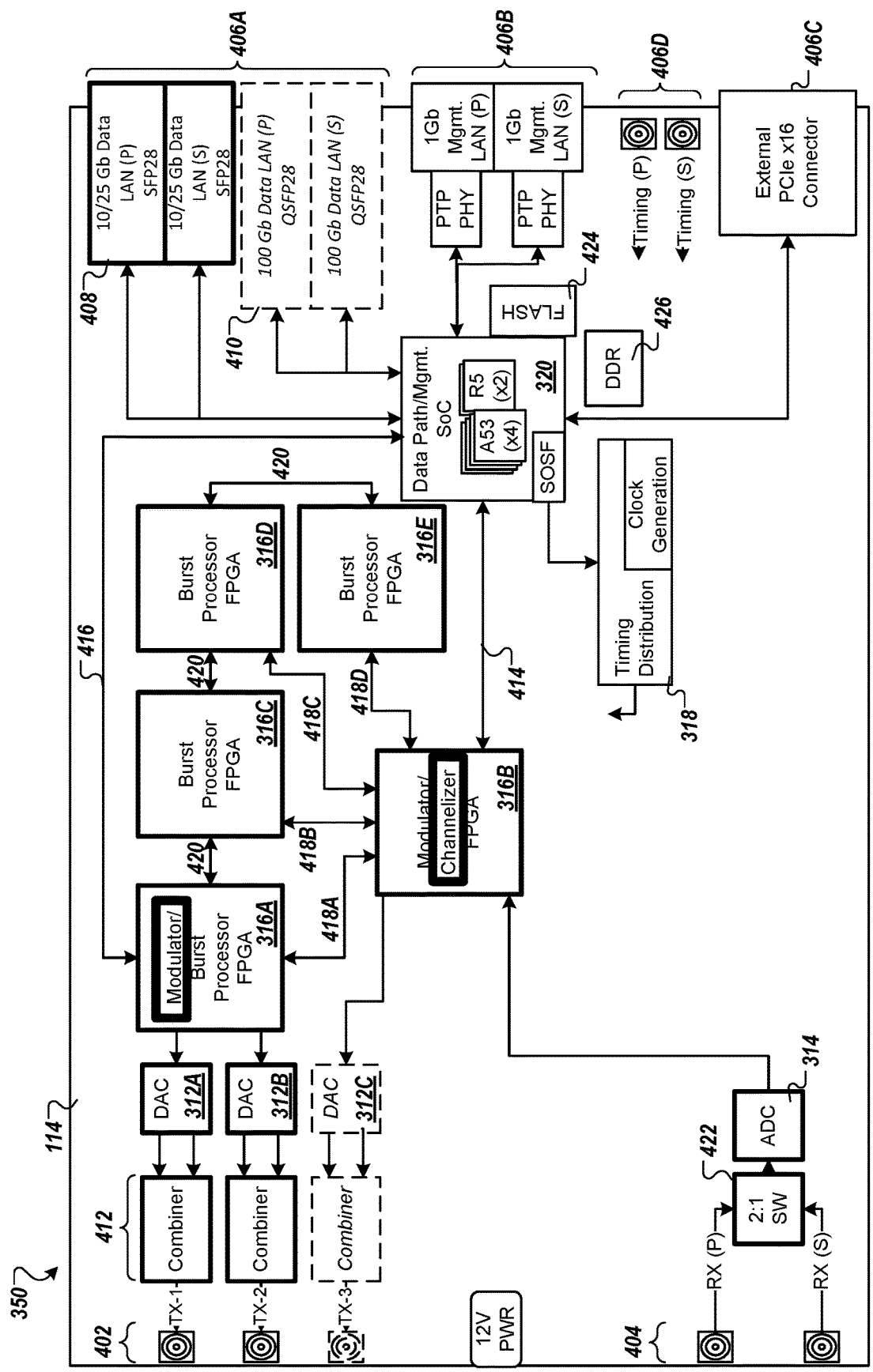
FIG. 4D is a diagram that illustrates an example configuration that uses the PCB in a high-performance modem.

FIG. 4D is a diagram that illustrates an example high-performance modem configuration 350 using the PCB 114. In the high-performance modem configuration 350, a subset of the sockets are selected and populated with corresponding hardware components. For example, in the high-performance modem configuration 340, the socket 316B receives a processor, such as an FPGA, that is configured as a channelizer. The socket 316A receives a processor, such as an FPGA, that is configured as a modulator. The other processor sockets 316C, 316D, and 316E each receive a processor, such as an FPGA, that is configured as a burst processor. Furthermore, two DAC sockets 312A and 312B, that are coupled the socket 316A populated with the modulator, each receive a DAC. As a result the configuration 350 can support transmission on two bands or sub-bands, e.g., or two frequency channels (e.g., LHCP and RHCP of the same band). The DAC socket 312C, which has a data connection with the processor socket 316B, does not receive a DAC in this example. To enable data reception and demodulation, the ADC socket 314 receives an ADC and the switch socket 422 receives a switch.

The high-performance modem 350 can perform both modulation functions and demodulation functions. For modulation, the modulator in the socket 316A can process the input data and transmit the digital signals to the DACs in the sockets 312A and 312B for conversion to analog output. For demodulation, a processor in the processor socket 316B acts as a channelizer, and distributes the signals for selected channels to burst processors in the sockets 316C, 316D, and 316E, for further processing.

Figure 4E:
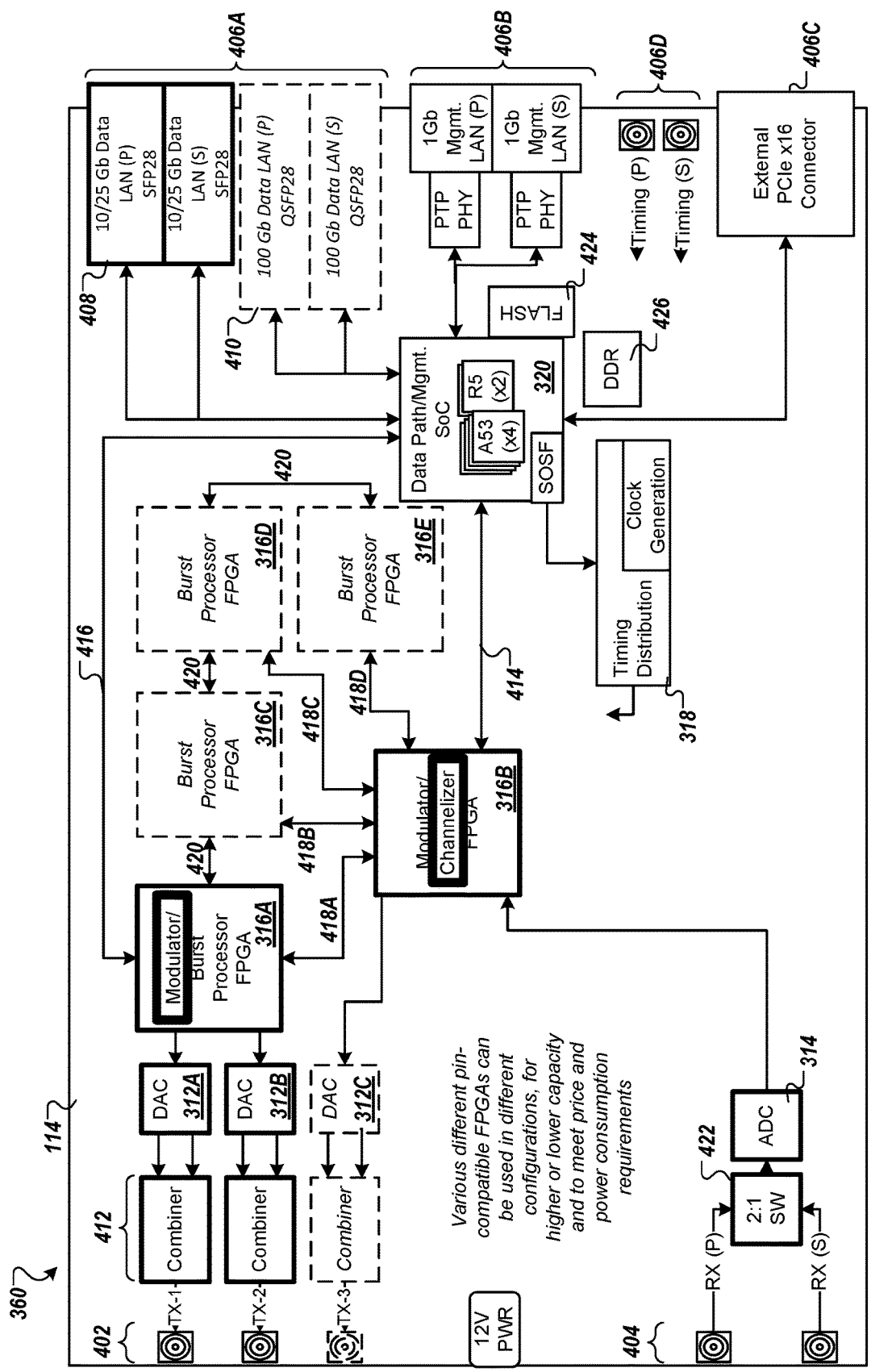
FIG. 4E is a diagram that illustrates an example configuration that uses the PCB in a low-cost or low-power modem.

FIG. 4E is a diagram that illustrates an example low-cost or low-power modem configuration 360 using the PCB 114. The configuration 360 provides modulation and demodulation like the configuration 350, but the configuration 350 uses fewer processors (e.g., two rather than five), and so may support only a lower load or throughput. For the low-cost modem configuration 360, a subset of the sockets are selected and populated with corresponding hardware components. For example, in the configuration 360, the socket 316B receives a processor, such as an FPGA, that is configured as a channelizer. The socket 316A receives a processor, such as an FPGA, that is configured as a modulator. The processor in the socket 316A, the processor in the socket 316B, or both may perform burst processing on the channelized signals. The other processor sockets 316C-316E do not receive a processor. Furthermore, the two DAC sockets 312A and 312B, that are in connection with the socket 316A populated with the modulator, each receive a DAC. The socket 312C does not receive a DAC in this example. The socket for ADC 314 receives an ADC to support reception.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A communication device, comprising:
   a printed circuit board (PCB) comprising conductors routed to support a plurality of different configurations of modulation and/or demodulation functionality, the printed circuit board having:
multiple analog output interfaces and one or more analog input interfaces,
multiple digital network interfaces, and
sockets for components including a controller, multiple processors, digital-to-analog converters (DACs), and an analog-to-digital converter (ADC), wherein the sockets for multiple processors comprise a first processor socket, a second processor socket, and one or more additional processor sockets;
wherein the first processor socket is coupled to receive output from the socket for the ADC, the first processor socket being arranged to receive a processor to function as a channelizer and provide data to any of multiple of the other processor sockets, wherein the first processor socket is coupled to the other sockets such that a processor in the first processor socket can distribute data to be demodulated among each of one or more processors in the other sockets;
wherein the second processor socket is coupled to provide output to one or more sockets for one or more of the DACs, such that second processor socket is arranged to receive a processor to function as a modulator for generating output to the DACs;
wherein the PCB includes (i) a connection between the first processor socket and the socket for the ADC and (ii) a connection between the first processor socket and the socket for at least one of the DACs, such that a processor in the first processor socket can be used as a channelizer to process data received from the ADC or as a modulator to provide modulated data to the at least one of the DACs;
wherein the PCB provides a data connection to couple the first processor socket and the second processor socket to the controller socket; and
wherein the one or more additional processor sockets each have a communication link to the first processor socket, wherein at least one of the additional processor sockets has a communication link to the second processor socket.

2. The communication device of claim 1, wherein the PCB includes (i) a connection between the second processor socket and the first processor socket, such that a processor in the second socket can receive data to demodulate from a processor in the first processor socket, and (ii) a connection between the second processor socket and one or more of the DACs such that a processor in the second socket can perform modulation and provide modulated data to the one or more of the DACs.

3. The communication device of claim 1, wherein the communication device is configured to function as a modulator, and the communication device includes (i) a first processor in the first processor socket of the PCB, wherein the first processor is configured as a modulator and (ii) a second processor in the second processor socket of the PCB, wherein the second processor is configured as another modulator.

4. The communication device of claim 3, wherein sockets for the DACs are each populated with a DAC, and the socket for the ADC is not populated with an ADC.

5. The communication device of claim 4, wherein the one or more additional processor sockets are each populated with a processor that is configured to perform demodulation.

6. The communication device of claim 3, wherein the one or more additional processor sockets are not populated with a processor.

7. The communication device of claim 1, wherein the communication device is configured to function as a demodulator, and the communication device includes (i) a processor in the first processor socket, wherein the first processor is configured as the channelizer, and (ii) a second processor in the second processor socket, and wherein the second processor is configured to perform demodulation.

8. The communication device of claim 7, wherein each of the sockets for the DACs are not populated with a DAC, and the socket for the ADC is populated with an ADC.

9. The communication device of claim 1, wherein the communication device is configured to function as a modem and includes (i) a first processor in the first processor socket, wherein the first processor is configured as a channelizer, and (ii) a second processor in the second processor socket, wherein the second processor is configured as a modulator.

10. The communication device of claim 9, wherein one or more of the sockets for the DACs are each populated with a DAC, and the socket for the ADC is populated with an ADC.

11. The communication device of claim 9, wherein the one or more additional processor sockets are each populated with a processor configured to perform demodulation.

12. The communication device of claim 1, wherein the PCB is configured to function as a modem and includes (i) a first processor in the first processor socket, wherein the first processor is configured as a channelizer, and (ii) a second processor in the second processor socket, wherein the second processor is configured as a modulator.

13. The communication device of claim 12, wherein one or more of the sockets for the DACs are each populated with a DAC, and the socket for the ADC is populated with an ADC.

14. The communication device of claim 1, comprising non-volatile memory storing one or more bitstreams for field-programmable gate arrays (FPGAs), the non-volatile memory being coupled to provide the bitstreams to FPGAs in the first processor socket, the second processor socket, and each of the one or more additional processor sockets; and
wherein the one or more bitstreams are configured to configure an FPGA to function as at least one of a modulator, a channelizer, or a burst processor, and wherein the communication device is configured to use different bitstreams to initialize FPGAs in different processor sockets according to a configuration for the communication device.

15. The communication device of claim 14, wherein the PCB supports a plurality of different configurations for the communication device, including to function as a modulator only, a demodulator only, or as a modem, wherein the different configurations are set by (i) populating different subsets of the sockets on the PCB and (ii) assigning different sets of bitstreams to program FPGAs in the processor sockets; and
wherein the PCB is configured such that, in at least some of the different configurations, different bitstreams are assigned to the FPGAs in at least the first processor socket and the second processor socket, such that selection of the bitstreams (i) selects between operating a processor in the first processor socket as a channelizer or as a modulator, and (ii) selects between operating a processor in the second processor socket as a burst processor or as a modulator.

16. The communication device of claim 1, wherein the first processor socket, the second processor socket, and each of the one or more additional processor sockets are each connected using a ring bus that provides bidirectional communication for each link in the ring bus.

17. A method comprising:
providing a printed circuit board (PCB) comprising conductors routed to support a plurality of different configurations of modulation and/or demodulation functionality, the printed circuit board having sockets for components including a controller, multiple processors, digital-to-analog converters (DACs), and an analog-to-digital converter (ADC), wherein the sockets for multiple processors comprise a first processor socket, a second processor socket, and one or more additional processor sockets, wherein the PCB includes (i) a connection between the first processor socket and the socket for the ADC and (ii) a connection between the first processor socket and the socket for at least one of the DACs, such that a processor in the first processor socket can be used as a channelizer to process data received from the ADC or as a modulator to provide modulated data to the at least one of the DACs;
selecting a configuration from among the plurality of different configurations;
selectively populating sockets of the PCB based on the selected configuration;
selecting bitstreams for programmable processors in the processor sockets, including:
selecting, for a programmable processor in the first processor socket, a bitstream from among a set of bitstreams that includes a bitstream for channelizer functionality and a bitstream for modulator functionality; and
selecting, for a programmable processor in the second processor socket, a bitstream from among a set of bitstreams that includes a bitstream for modulator functionality and a bitstream for burst processor functionality; and
storing the selected bitstreams to a memory coupled to the PCB to enable the programmable processors to operate according to the corresponding bitstreams selected for the programmable processors.

18. The method of claim 17, wherein the PCB provides a communication link from each of the one or more additional processor sockets each to the first processor socket, wherein the PCB provides a communication link from at least one of the additional processor to the second processor socket.

19. The method of claim 18, wherein the plurality of different configurations comprise configurations in which different numbers of processors are used and configurations in which processors in the first processor socket and the second processor sockets are used for different modulation and demodulation functions.

\* \* \* \* \*